United States Patent
Zaffino (10) Patent No.: US 8,140,093 B2
(45) Date of Patent: Mar. 20, 2012

(54) WIRELESS LANDMARK-BASED OPERATION OF A WIRELESS DEVICE

(75) Inventor: Richard Zaffino, Kirkland, WA (US)

(73) Assignee: AT&T Mobility II, LLC, Atlanta, GA (US)

( * ) Notice: Subject to any disclaimer, the term of this patent is extended or adjusted under 35 U.S.C. 154(b) by 1167 days.

(21) Appl. No.: 11/624,552

(22) Filed: Jan. 18, 2007

(65) Prior Publication Data

US 2008/0176584 A1 Jul. 24, 2008

(51) Int. Cl.
H04W 24/00 (2009.01)
(52) U.S. Cl. .................. 455/456.3; 455/456.1
(58) Field of Classification Search ............... 455/414.3, 455/456.1–456.3
See application file for complete search history.

(56) References Cited

U.S. PATENT DOCUMENTS

| | | | |
|---|---|---|---|
| 6,493,327 B1 | 12/2002 | Fingerhut | |
| 6,795,710 B1 | 9/2004 | Creemer | |
| 7,103,351 B2 * | 9/2006 | Chaudhari et al. | 455/414.1 |
| 7,720,436 B2 * | 5/2010 | Hamynen et al. | 455/13.1 |
| 2003/0125042 A1 | 7/2003 | Olrik et al. | |
| 2005/0080665 A1 | 4/2005 | Bowman-Amuah | |
| 2005/0221808 A1 * | 10/2005 | Karlsson et al. | 455/418 |
| 2007/0135135 A1 * | 6/2007 | Brown | 455/456.1 |

* cited by examiner

Primary Examiner — Nick Corsaro
Assistant Examiner — Joel Ajayi
(74) Attorney, Agent, or Firm — Zagorin O'Brien Graham LLP (57) ABSTRACT

A technique configures a wireless device to perform operations based on the wireless device being within or near a particular physical environment. A wireless signal source identifier (e.g., a cell site identifier) serves as a wireless landmark for the particular physical environment. When the wireless device detects the wireless landmark, the wireless device performs operations previously associated with the wireless landmark. To define a wireless landmark for a particular physical environment, the wireless device detects wireless communications signals and decodes the signals to determine wireless signal source identifiers. A user selects a particular wireless signal source identifier and associates the selected wireless signal source identifier with an indication of the physical environment, such as a character string representation of the physical environment. The user indicates one or more operations for the wireless device to perform in response to subsequent detection of the wireless landmark.

22 Claims, 8 Drawing Sheets

WIRELESS LANDMARK-BASED OPERATION OF A WIRELESS DEVICE

BACKGROUND OF THE INVENTION

1. Field of the Invention

This application is related to wireless devices and more specifically, to wireless devices with multimedia capabilities.

2. Description of the Related Art

Multimedia devices may be combined with mobile communications devices to form a single device (e.g., a convergence device) that provides both telecommunications and multimedia capabilities. In general, as referred to herein, a "convergence device" is a single product including one or more devices that combine separate technologies (e.g., voice and telephony features, data applications, and video features) that share resources on the product. For example, a device that plays audio or video files may be combined with a cellular communications device to form a single product that allows a user to listen to music and to transmit or receive communications. In general, although multimedia and communications features of a wireless multimedia device are available to the user, these features may not provide integrated services. Accordingly, new techniques for configuring and operating mobile multimedia communications products are desired.

SUMMARY OF THE INVENTION

A technique configures a wireless device to perform operations based on the wireless device being within or near a particular physical environment. A wireless signal source identifier (e.g., a cell site identifier) serves as a wireless landmark for the particular physical environment. When the wireless device detects the wireless landmark (i.e., the wireless signal source identifier encoded in a signal received by the wireless device), the wireless device performs operations previously associated with the wireless landmark. To define a wireless landmark for a particular physical environment, the wireless device detects wireless communications signals and decodes the signals to determine wireless signal source identifiers. A user selects a particular wireless signal source identifier and associates the selected wireless signal source identifier with an indication of the physical environment, such as a character string representation of the physical environment. The user indicates one or more operations for the wireless device to perform in response to subsequent detection of the wireless landmark.

In at least one embodiment of the invention, a method for wireless landmark-based operation of a wireless device includes detecting a wireless communications signal by the wireless device. The method includes recognizing a wireless signal source identifier associated with the detected wireless communications signal as a wireless landmark associated with a particular physical environment. The method includes performing a set of one or more operations associated with the wireless landmark by the wireless device.

In at least one embodiment of the invention, a wireless device program product is encoded in one or more machine-readable media. The wireless device program product includes a first sequence of instructions executable to recognize a wireless signal source identifier as a wireless landmark for a particular physical environment. The wireless device program product includes a second sequence of instructions executable to determine a set of one or more wireless device operations to perform in response to recognizing the wireless signal source identifier as a wireless landmark.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

A wireless landmark may be used to adapt or modify behavior of a wireless device for particular physical environments. The wireless device may be configured to detect a wireless landmark. The wireless device may perform a predetermined set of one or more operations in response to detection of the wireless landmark by the wireless device. A network may deliver content associated with the physical environment to the wireless device in response to detection of the wireless landmark by the wireless device.

Wireless Landmark-Based Operation of a Wireless Device

Figure 1:
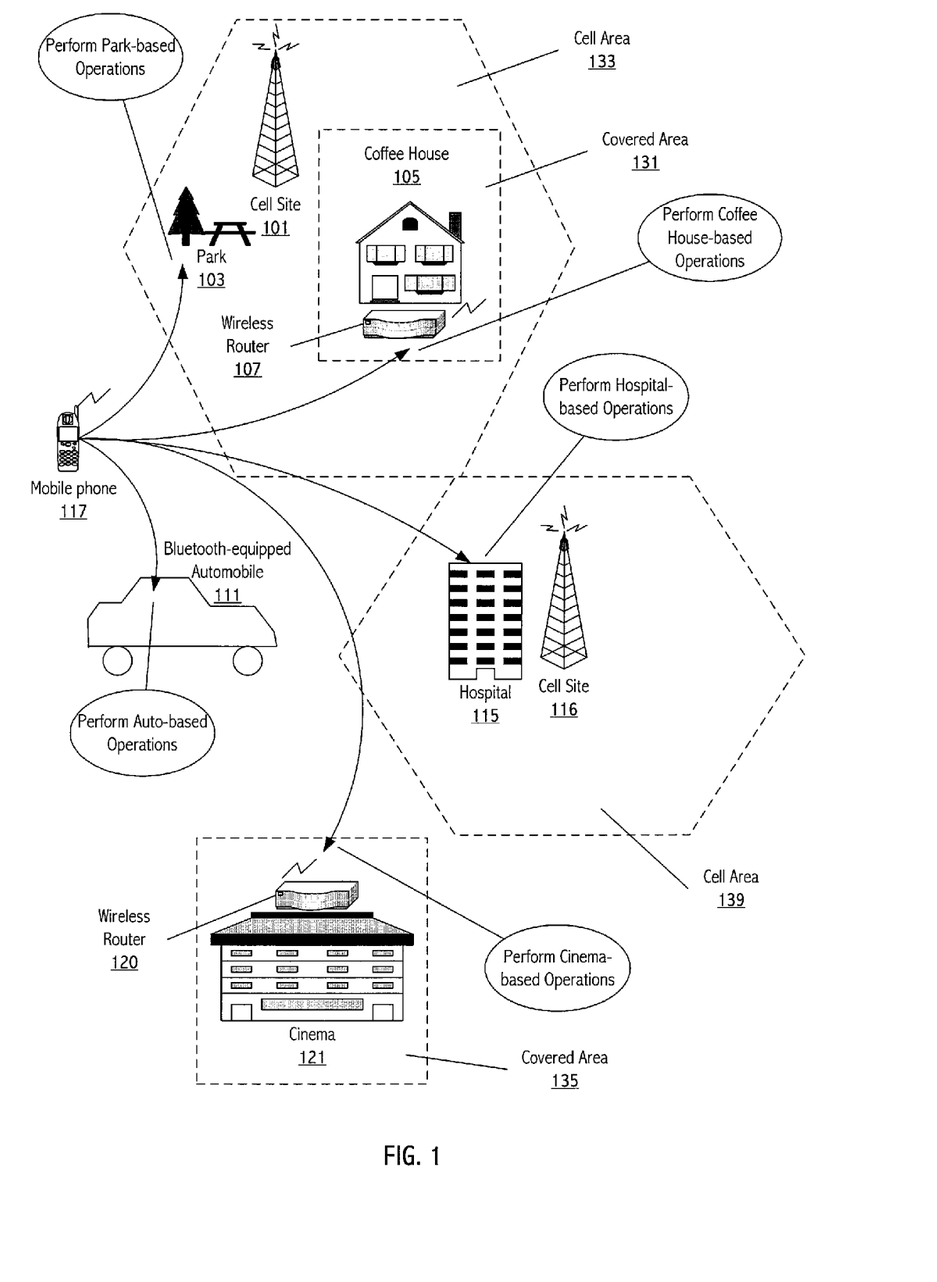
FIG. 1 illustrates an exemplary wireless communications device operating in accordance with at least one embodiment of the present invention.

Referring to FIG. 1, an exemplary wireless device (e.g., mobile phone 117) operates in response to detection of different physical environments encountered by the wireless device, as identified by corresponding wireless landmarks. When mobile phone 117 powers up, mobile phone 117 registers with a cell site or base station (e.g., cell site 101 or cell site 116) in the cell to allow mobile phone 117 to initiate and to receive calls, as well as participate in other services. Mobile phone 117 searches for received signals having a characteristic (e.g., one or more frequencies) identified in a list of characteristics in a subscriber identify module (SIM). Upon detecting a signal having one of those characteristics, mobile phone 117 may establish a radio frequency communications path between the mobile device and the cell site or base station in the cell. After establishing a radio frequency communications path, the mobile device provides information to a mobile switching center (MSC) for registration of the mobile device. In addition, the network validates the account associated with mobile phone 117 before allowing any calls to be made or received.

In at least one embodiment of a wireless landmark-based system, when mobile phone 117 is located in Bluetooth®-equipped automobile 111, mobile phone 117 detects a Bluetooth address, which is recognized by mobile phone 117 as a wireless landmark for the particular physical environment of automobile 111. In response to recognizing the wireless landmark for the automobile 111, mobile phone 117 performs one or more operations that a user previously associated with the physical environment of automobile 111. For example, mobile phone 117 may begin playing particular news-related audio files when mobile phone 117 detects the wireless landmark for automobile 111.

In at least one embodiment of a wireless landmark-based system, mobile phone 117 recognizes a cell site identifier broadcast from cell site 101 over cell area 133 as a wireless landmark for park 103, which is in cell area 133. When the mobile phone 117 detects the wireless landmark for the park 103, mobile phone 117 accesses and plays a particular audio play list that a user previously designated for playing when in the park 103.

Cell area 133 also includes a business, e.g., coffee house 105. In addition to signals from cell site 101, wireless router 107 inside coffee house 105 transmits signals. Mobile phone 117 may recognize a Service Set Identifier (SSID) from wireless router 107 as a wireless landmark for coffee house 105, rather than the identifier for the cell site 101. The user of the mobile phone 117 previously associated a music play list of jazz and blues with the wireless landmark for coffee house 105. When the mobile phone 117 detects the wireless landmark for coffee house 105, mobile phone 117 opens and plays the jazz and blues play list.

Some physical environments may not be friendly to some or all functions of mobile devices. For example, hospital 115 may have a policy prohibiting usage of mobile devices within the hospital. Thus, a user may configure mobile phone 117 to power off in response to detecting a wireless landmark associated with hospital 115. Since hospital 115 is within cell area 139, a user may register the cell site identifier for cell site 116 as a wireless landmark for hospital 115. When mobile phone 117 recognizes the wireless landmark for hospital 115, then mobile phone 117 powers off. Similarly, a user may register an SSID from wireless router 120 as a wireless landmark for cinema 121. The user may configure mobile phone 117 to switch a ringer into silent mode when detecting the wireless landmark for cinema 121. When mobile phone 117 detects the SSID from the wireless router 120, then mobile phone 117 configures the ringer for a silent mode. In yet another example, a user may configure mobile phone 117 for operation during air travel or other circumstances that prohibit the use of radio frequency communications. In response to detecting a wireless landmark associated with an airplane, mobile phone 117 powers off only a radio interface (e.g., a transmit or receive interface) of mobile phone 117 while other portions of mobile phone 117 remain powered-on. In addition, mobile phone 117 may be configured to restore power to the radio interface in response to detecting the absence of the wireless landmark associated with air travel or in response to detection of another wireless landmark (e.g., a wireless landmark associated with a particular land-based environment).

Although the examples depicted in FIG. 1 designate a single identifier as a particular wireless landmark, in at least one embodiment of a wireless landmark-based system, multiple individual identifiers are defined as a particular wireless landmark, or combinations of individual identifiers may be defined as a particular wireless landmark. For example, both the cell site identifier for cell site 101 and the SSID from the wireless router 107 may each be defined as a wireless landmark for coffee house 105. In another example, a combination of the Bluetooth® address for automobile 111 and a cell site identifier for a cell site near a user's home are designated as a wireless landmark for a physical environment within a 10 minute driving time from the user's home. Exemplary wireless landmark-based operations include generating and sending a message (e.g., a predefined text message or other suitable message) in response to detecting the wireless landmark. The message may be sent directly to a spouse's phone or to a server operated by a service provider, which is preconfigured to send another message to the spouse. However, mobile phone 117 performs those operations only if it detects both identifiers. When combining identifiers as a single wireless landmark, a particular window of time may be designated for detection of the wireless landmark. For example, the Bluetooth® address and the cell site identifier for home must both be detected within 10 seconds of each other, otherwise mobile phone 117 does not effectively detect the wireless landmark and the text message is not sent.

In general, a wireless device may conditionally perform wireless landmark-based operations. For example, mobile phone 117 does not generate and send the predefined text message unless mobile phone 117 recognizes the wireless landmark for the location near home during a weekday, between the hours of 5:00 PM and 7:00 PM. Conditions may be based on one or more of day, time, amount of power remaining in an energy storage device coupled to the wireless device, balance of the user's account, roaming status, or other suitable variables. Conditions may be evaluated by mobile phone 117 or by a server in a network including mobile phone 117 configured to evaluate conditions and communicate results of the evaluation to mobile phone 117.

In at least one embodiment of a wireless landmark-based system physical environments may be generic or specific. For example, multiple wireless landmarks are defined for a generic physical environment. A set of operations may be associated with any wireless-landmarked coffee house that mobile phone 117 encounters. For example, mobile phone 117 may play a jazz and blues play list in response to detecting a wireless landmark for a coffee house, independent of which coffee house is encountered. The mobile phone associates physical environments with generic environment indications (e.g., both coffee house 105 and another coffee house in the same or other cell area are tagged as coffee houses in addition to their specific names). The set of operations is then associated with all wireless landmarks associated with a generic physical environment of a coffee house.

Figure 2:
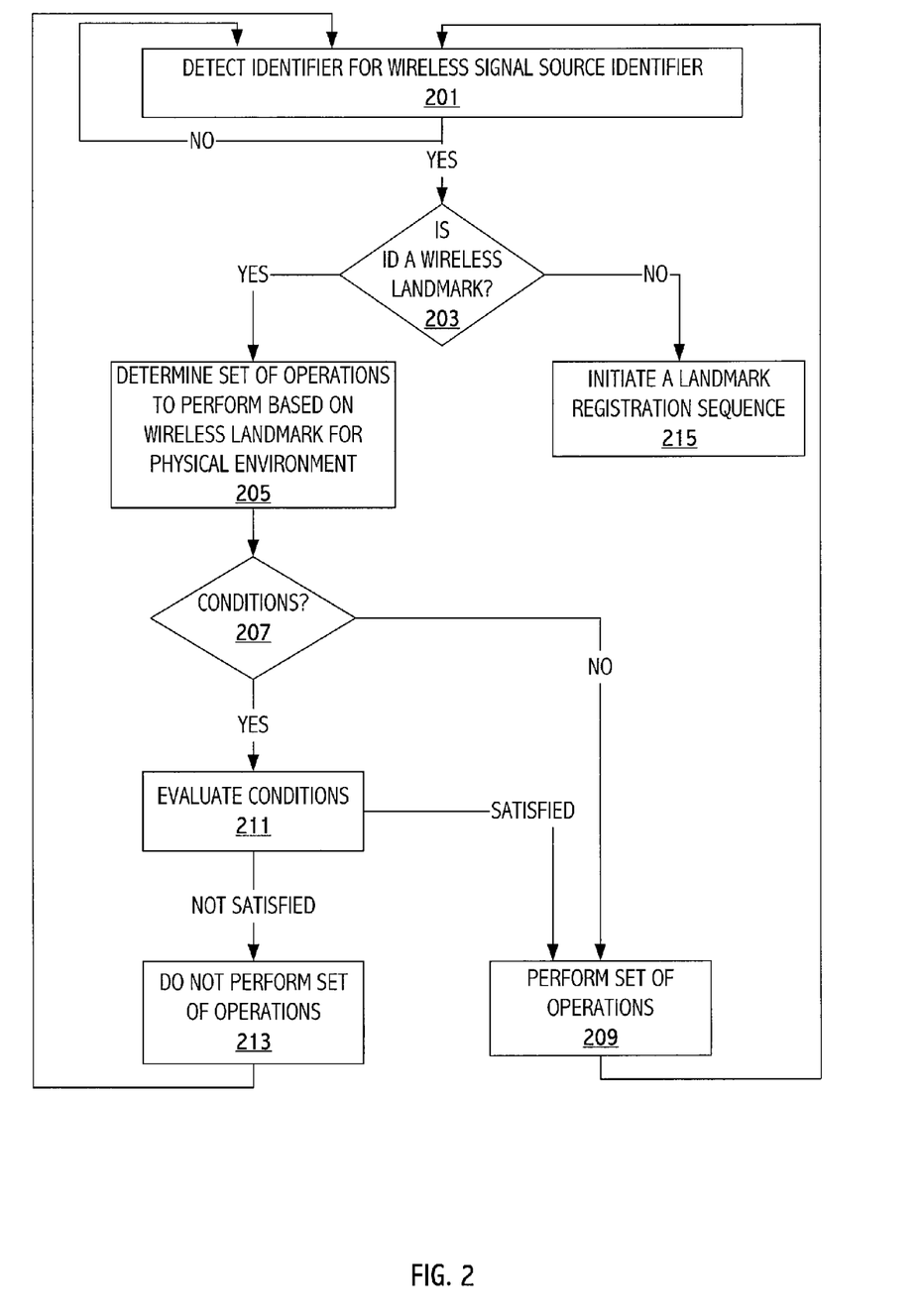
FIG. 2 illustrates exemplary information and control flows for wireless landmark-based operation of a wireless communications device consistent with at least one embodiment of the present invention.

Referring to FIG. 2, in at least one embodiment of a wireless landmark-based system, a wireless device detects a wireless signal source identifier in a received wireless communications signal (201). The wireless device determines whether the detected wireless signal source identifier is a wireless landmark for a particular physical environment (203). For instance, the wireless device searches a memory to find the wireless signal source identifier in a list of predetermined wireless landmarks. If the detected wireless signal source identifier is recognized as a wireless landmark, then the wireless device proceeds to determine operations associated with the wireless landmark (205). Note that the operations may not include connecting the wireless device to the wireless communications signal used as a wireless landmark and the wireless device may not have secured access to use the wireless communications signal used as a wireless landmark.

If the detected identifier is not recognized as a wireless landmark, then control may flow to a wireless landmark registration sequence of operations (215). However, it should be appreciated that it is not necessary to automatically register a wireless signal source identifier that is not recognized as a wireless landmark. The wireless device may prompt a user to indicate whether or not the detected identifier should be registered as a wireless landmark for a physical environment to be indicated by the user. Alternatively, the wireless device may ignore wireless signal source identifiers that are not already registered wireless landmarks.

In at least one embodiment of a wireless landmark-based system, a set of operations to be performed based on detection of the wireless landmark is conditionally executed (207) based on predetermined conditions for the set of operations and/or the wireless landmark. For example, a particular play list may not be played before a certain time of day. If a set of operations are conditional, the wireless device evaluates the conditions (211). If the conditions are satisfied, then the wireless device performs the set of operations (209) and the wireless device proceeds to detecting wireless signal source identifiers (201). If the conditions are not satisfied, then the wireless device does not perform the set of operations (213) and the wireless device proceeds to detecting wireless signal source identifiers (201).

In at least one embodiment of a wireless landmark-based system, rather than regulating performance of operations, one or more conditions may be utilized to select a particular set of operations from a plurality of sets of operations. For example, the set of operations may be selected based on both the wireless landmark and day of the week. In another example, a certain set of operations may be selected for a wireless landmark on weekends, but will not be played if an account balance exceeds a certain amount.

Figure 3:
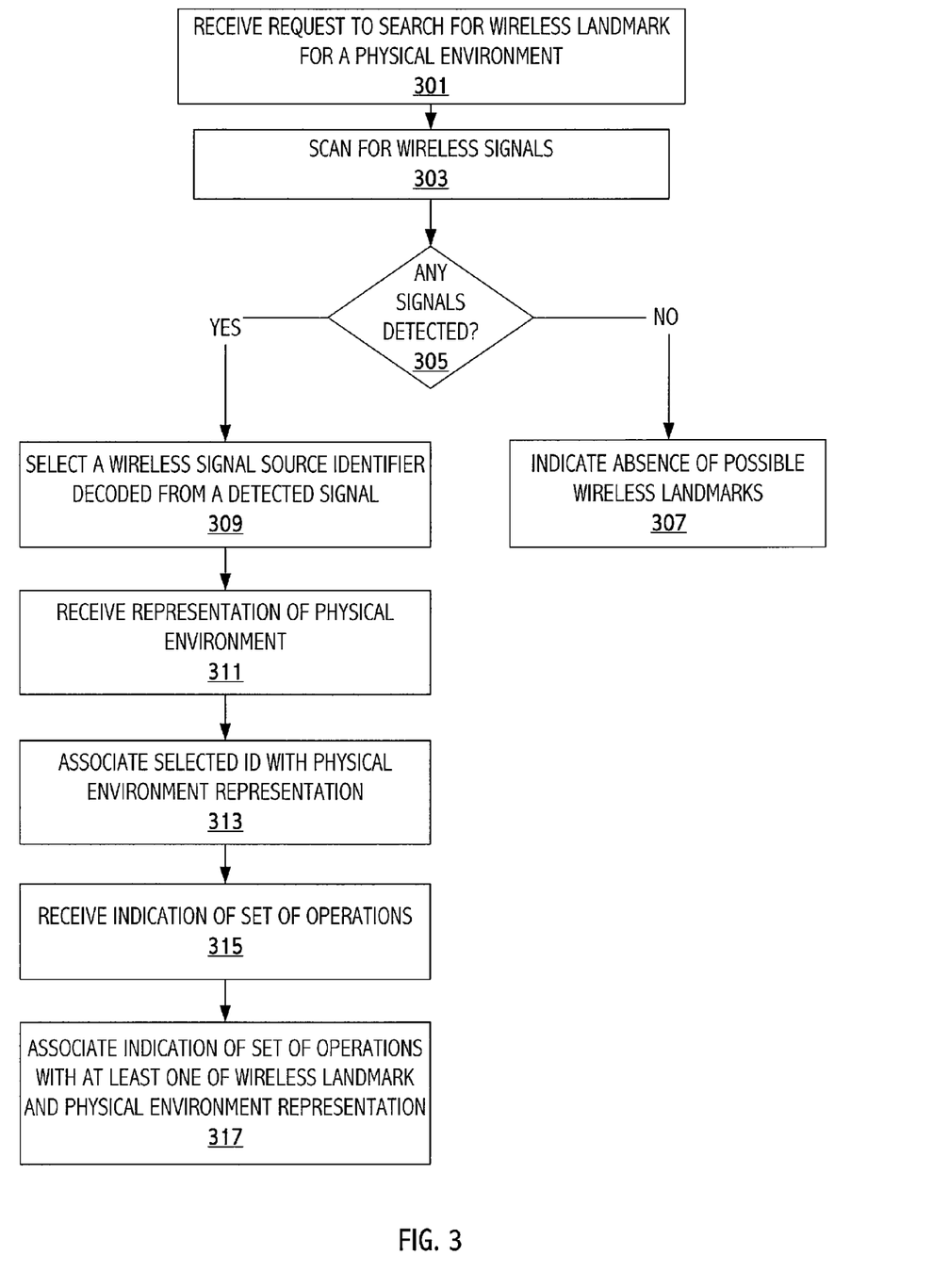
FIG. 3 illustrates exemplary information and control flows associated with registration of a wireless landmark and corresponding operations consistent with at least one embodiment of the present invention.

Referring to FIG. 3, to perform operations based on a wireless device encountering a wireless landmark, the wireless device is configured with appropriate information, e.g., the wireless device is configured with an association between a wireless signal source identifier as a landmark for a particular physical environment and corresponding operations. The wireless device receives a request to search for a wireless landmark to associate with a particular physical environment (301). For example, a user configures a wireless device in a wireless landmark search mode. The wireless device receives signals and decodes these signals consistent with a predetermined list of frequencies and/or protocols, e.g., frequencies and/or protocols supported by the wireless device. The list of frequencies and/or protocols may be a static list defined in the wireless device, a user-defined list, or a list that can be modified by the user and a network that provides one or more services to the wireless device. The wireless device may be configured to search for wireless landmarks automatically (e.g., by periodically searching, by searching responsive to a transition to a different cell, or by other suitable techniques). The wireless device searches for wireless signals having at least one wireless signal source identifier (303). The wireless device then determines whether any such wireless signals are detected (305). If no such signals are detected, then the wireless device indicates an absence of possible wireless landmarks (307). If a signal is detected that encodes a wireless signal source identifier (305), then the wireless signal source identifier is selected as a wireless landmark for the physical environment (309). When a wireless device detects multiple wireless signal source identifiers that are suitable as a wireless landmark for a particular physical environment, then the wireless device may select one of the signal source identifiers or may define the wireless landmark as a combination of two or more of the detected signal source identifiers. If only one of multiple detected wireless signal source identifiers will be defined as a wireless landmark, then the identifier may be selected based on one or more characteristics of the carrying signal (e.g., signal strength, type of signal, protocol information associated with a particular signal type, one or more characteristic associated with a particular type of wireless signal identified by the selected signal, or other suitable characteristic). For example, if a cell site identifier and an SSID are detected, then the wireless device may choose the SSID since it has a more limited range and is more specific to a particular physical environment. The wireless device may also present a user with information about the carrying signals and allow a user to select a wireless signal source identifier or other suitable combinations of wireless signal source identifiers to define as a wireless landmark.

In at least one embodiment of a wireless landmark-based system, the wireless device receives a representation of the physical environment (311). For example, a user types in "automobile" or selects "automobile" from a set of choices provided by a memory on the wireless device. In addition to carrying the wireless signal source identifier, a signal may also carry information identifying a particular physical environment. The information may be used as the physical environment representation, used to filter options of physical environment representations presented to a user, etc. Note that the representation of the physical environment may be performed in conjunction with receiving a request to search for wireless landmarks for a particular physical environment (301). The selected wireless signal source identifier is associated with the physical environment representation (313). The wireless device receives an indication of a set of one or more operations (315). For example, the user inputs a sequence of commands to be performed by the wireless device when the wireless landmark is encountered during operation. In another example, the user selects various available wireless landmark-based operations. The operations may be at least one of multimedia manipulation and/or playback (e.g., playing audio and or video, displaying images, recording images and/or audio, etc.), device configuration (e.g., setting display backlight, setting display image, setting a ringer, powering off, disabling or enabling a radio interface, changing power mode, etc.), communication operations (e.g., transmitting a pre-defined text message, making a phone call, sending an e-mail, sending a voicemail, etc.), application operations (e.g., setting a calendar reminder, displaying a calendar reminder, updating software on the device, etc.), or other suitable operations. The registration technique associates the indication of the set of operations with at least one of the physical environment representation and the wireless landmark (317).

Wireless landmark-Based Delivery of Content to a Wireless Device

During wireless landmark-based operations of a wireless device, detection of a wireless landmark associated with a particular physical environment may trigger a network to deliver multimedia content or other content to a wireless device. In at least one embodiment of a wireless landmark-based system, the wireless device recognizes a wireless signal source identifier as a wireless landmark, and sends an indicator thereof to a network. However, the wireless device itself may not recognize the wireless signal source identifier as a wireless landmark. In at least one embodiment of a wireless landmark-based system, the wireless device reports information to a network (e.g., one or more servers in a network) that allows the network to recognize the wireless landmark.

Figure 4:
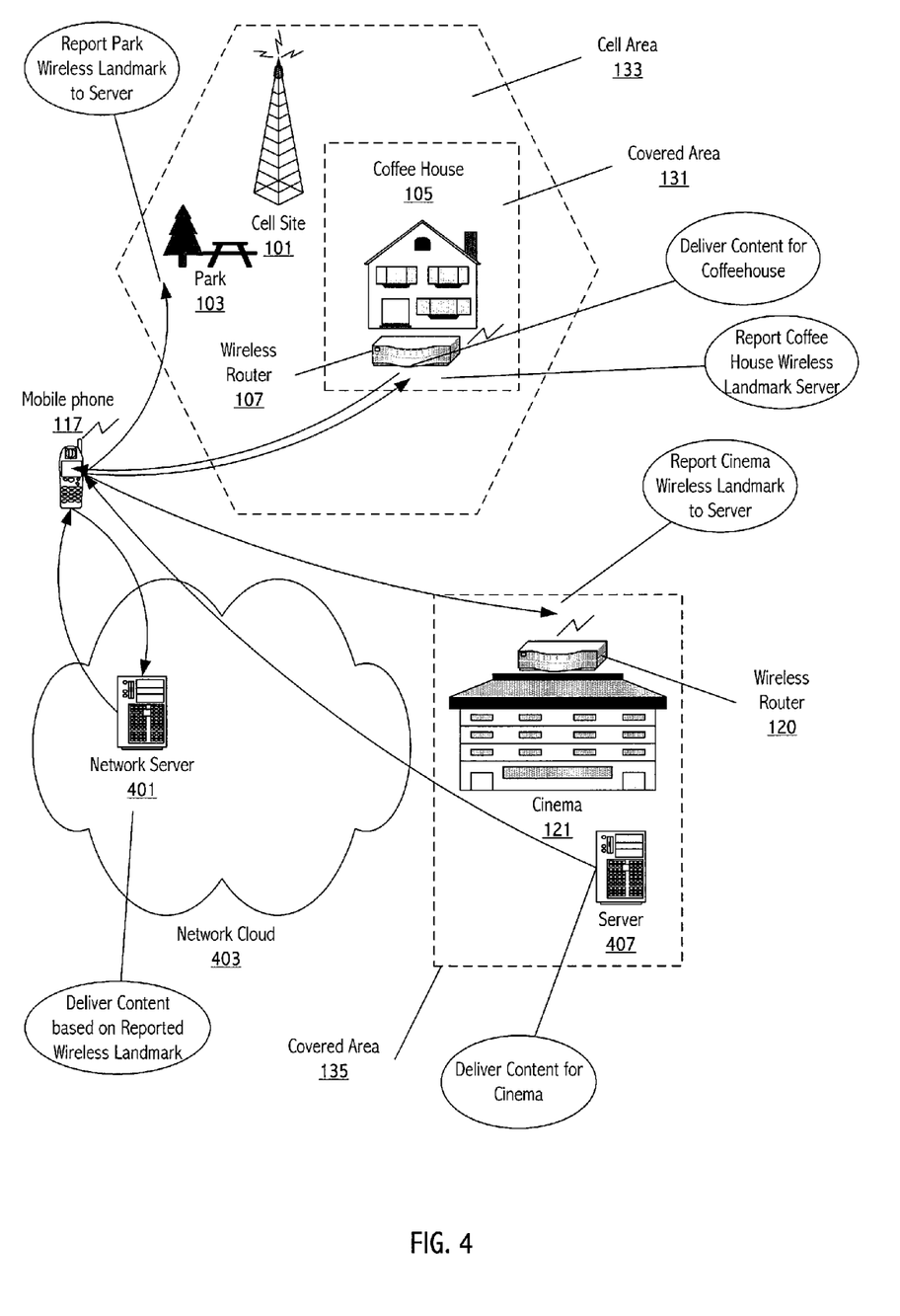
FIG. 4 illustrates an exemplary wireless communications system performing wireless landmark-based delivery of content to a wireless communications device consistent with at least one embodiment of the present invention.

Referring to FIG. 4, an exemplary wireless device receives multimedia content that is delivered to the mobile device (e.g., mobile phone 117) based on wireless landmarks. When mobile phone 117 is in park 103, mobile phone 117 reports detection of a wireless signal source identifier to network server 401 in network cloud 403. If a wireless landmark is defined for park 103 in the same cell as mobile phone 117, then mobile phone 117 may report the wireless landmark to network server 401. If the wireless signal source identifier is not recognized by mobile phone 117, then mobile phone 117 reports the wireless signal source identifier to network server 401. If network server 401 identifies the wireless signal source identifier as a wireless landmark for park 103, network server 401 identifies content associated with park 103 and delivers the content (or causes the content to be delivered by another entity) to mobile phone 117. As referred to herein, content includes one or more of text information, audio information, video information, applications, image information, and control information (e.g., configuration information). In at least one embodiment, network server 401 may transmit text messages with park announcements to mobile phone 117 in response to mobile phone 117 reporting the wireless signal source identifier used as a wireless landmark for park 103 to network server 401. In at least one embodiment, when mobile phone 117 reports a wireless landmark for coffee house 105 to network server 401, network server 401 delivers to mobile phone 117 music of an artist featured by coffee house 401. In at least one embodiment, when mobile phone 117 reports a wireless landmark for cinema 121 to network server 401, network server 401 supplies information to server 407 at cinema 121. Sever 407 then delivers information for upcoming movies (e.g., video clips, text descriptions, a web page, etc.) to mobile phone 117.

Figure 5:
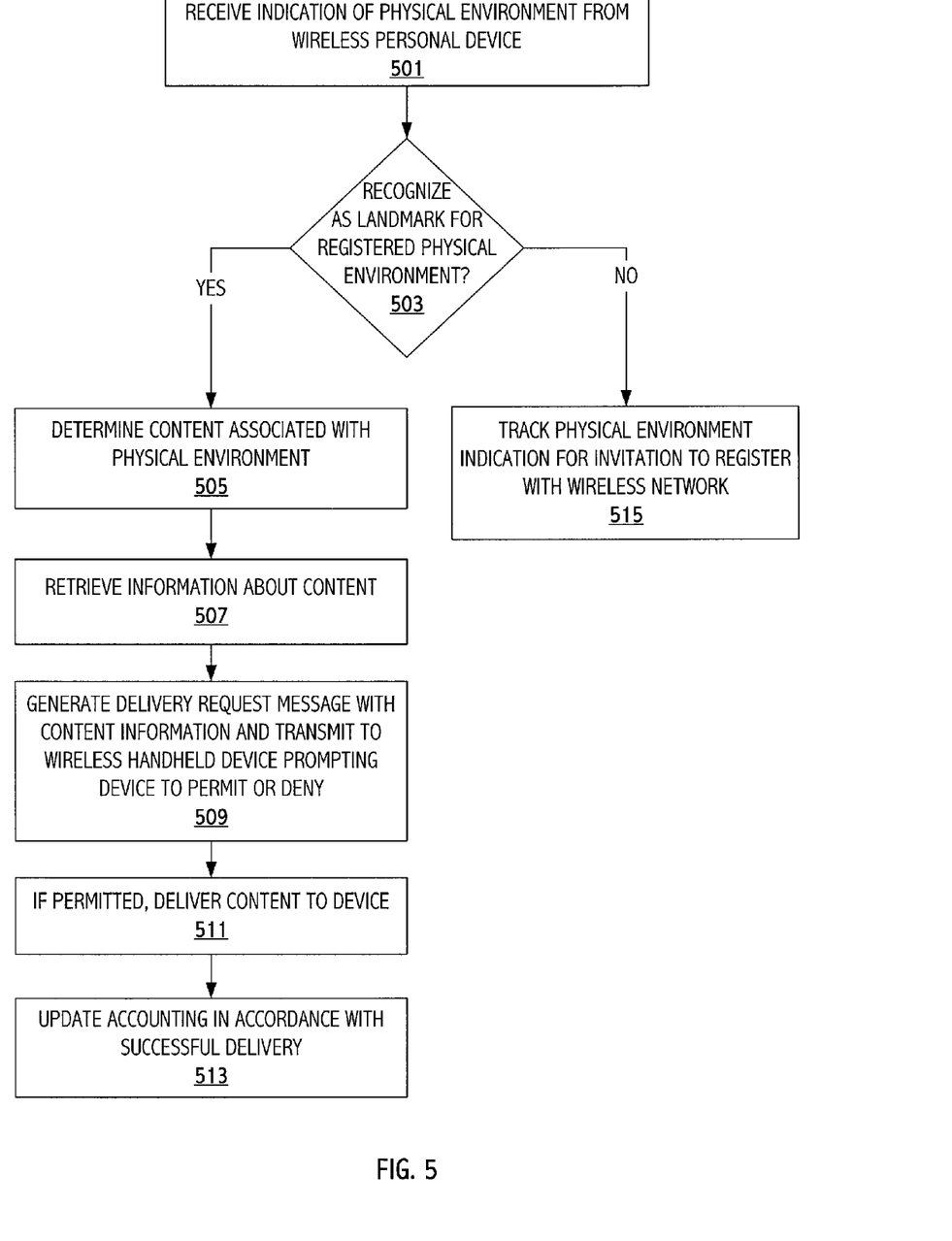
FIG. 5 illustrates exemplary information and control flows associated with wireless landmark-based delivery of content to a wireless communications device.

Referring to FIG. 5, exemplary operation of a server that causes wireless landmark-based delivery of content to a reporting wireless device includes the wireless device receiving an indication of a physical environment (501). In at least one embodiment of a wireless landmark-based system, a wireless device transmits a reporting message with a wireless signal source identifier to a network server. In another example, the wireless device recognizes the wireless landmark and transmits both the signal source identifier and a representation of the physical environment to the network. The wireless device or network determines whether the reported information for the physical environment is a wireless landmark (503). If the reported information is recognized as a defined wireless landmark, then the system accesses content associated with the particular physical environment (505). If the reported information is not recognized as a wireless landmark by the network, then the network may track at least some of the reported information (515) or discard the information. For example, if the reported information corresponds to a coffee house that is not registered with the network, i.e., a wireless landmark has not been defined for the coffee house, then the reported information may be stored and used by a network sales representative to invite the coffee house to register with the network and allow a wireless landmark to be defined for the coffee house for wireless landmark-based content delivery. The reported information may be tracked for statistical purposes or other suitable purposes.

If the indication received by the network is a registered wireless landmark, then the network determines any content associated with the physical environment (505). The network may also retrieve information associated with the content (e.g., content type, size of content, etc.) (507). Note that actions taken by the network in response to detecting a wireless landmark may be conditional or unconditional, as described above with regard to conditional operations of mobile phone 117 and FIG. 2. The network generates a delivery request message and transmits the delivery request message to the wireless device (509). In at least one embodiment of the network, the delivery request message invokes a prompt for permission or denial of the delivery. If permitted, then the network delivers content to the wireless device (511). In at least one embodiment of the network, no delivery request message is generated or transmitted and the network delivers content to the wireless device unconditionally. The content may be delivered by a server within the network or may be delivered by a device for the physical environment. For example, although network server 401 may transmit a delivery request message to mobile phone 117 (509), server 407 is responsible for delivering the content to mobile phone 117. Once permitted, network server 401 supplies information to server 407 to allow server 407 to deliver the content to mobile phone 117 (511). The network may update accounting in accordance with a successful delivery or other suitable criteria (513). For example, the network may track a number of users exposed to a physical environment owner, an amount of content delivered for a physical environment, bandwidth utilized for delivering content, or other suitable parameters.

Figure 6:
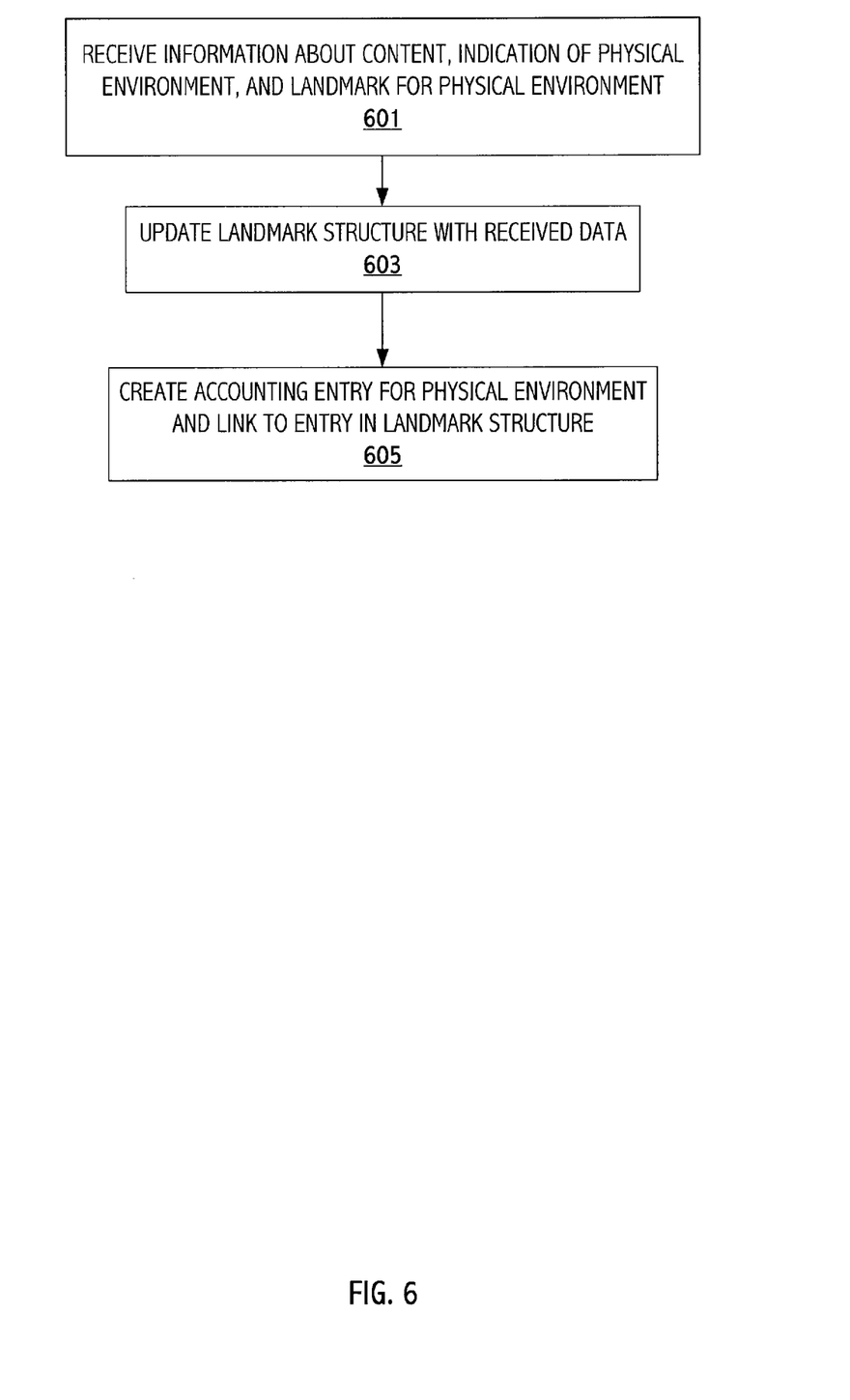
FIG. 6 illustrates exemplary information and control flows associated with registration of a physical environment for wireless landmark-based content delivery.

Referring to FIG. 6, an exemplary technique registers a physical environment for wireless landmark-based content delivery. A network receives information about content, representation of a physical environment, and a wireless landmark for the physical environment (601). For example, the network parses a message (or data input by a user) that indicates information about an audio file for a musician who will perform at a venue, the name of the venue, and a wireless signal source identifier for the venue, which will be defined as the wireless landmark for the venue. The network updates a wireless landmark data structure with the received data (603). For example, a table of wireless landmarks indicates the physical environment representation and the wireless landmark. The network may also update the table to include the content, a pointer to a storage device that hosts the content, a pointer to a reference table for content, address information for the device to deliver the content, etc. The network may create and/or maintain accounting entries for the physical environment and link the accounting entries to corresponding entries in the wireless landmark data structure (605). A particular physical environment may have multiple entries for different wireless landmarks associated with that physical environment.

Figure 7:
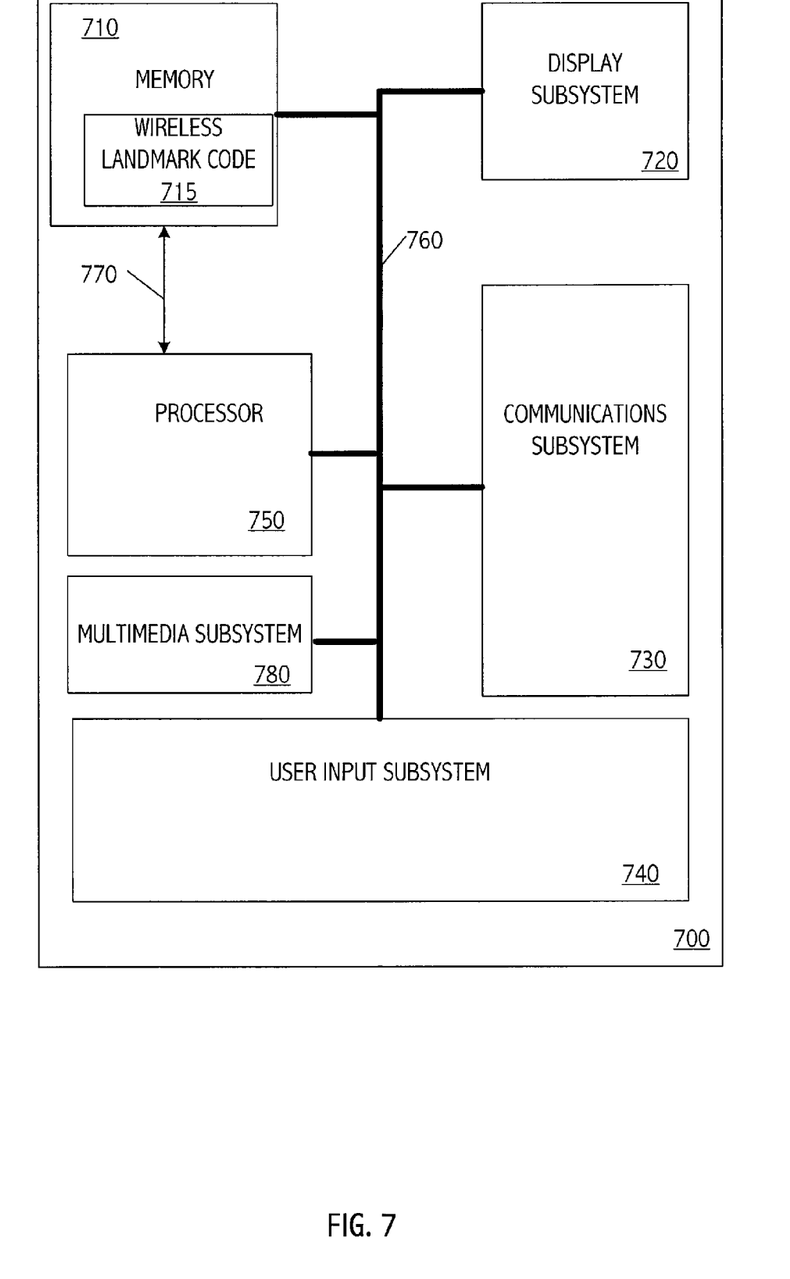
FIG. 7 illustrates an exemplary wireless communications device.

Referring to FIG. 7, an exemplary wireless device 700 includes memory 710, display subsystem 720, communications subsystem 730, user input subsystem 740, multimedia subsystem 780 (e.g., audio decoder, video decoder, or other multimedia subsystem), processor 750, and bus 760, which permits communication between processor 750, memory 710, and the various subsystems 720, 730, 740, and 780. Other elements may be included and various configurations are possible. It should be noted that although elements are illustrated separately, some elements may be integrated into one element. Communications subsystem 730 may include a wireless interface (not illustrated) including transmitter and receiver elements for communicating between wireless device 700 and a wireless service provider, or to a wireless base station. The user input subsystem 740 generally includes various buttons, keys, switches, etc. that may be employed by a user to interact with messages displayed using display subsystem 720, or to initiate various functions of wireless device 700.

Memory 710 may be any of various types of fixed or removable memory media, such as Secure Data (SD)

memory, CompactFlash (CF) memory, random access memory (RAM), read-only memory (ROM), etc. Generally, memory 710 stores code or instructions executable to perform the operations to register a wireless landmark, to search for signal source identifiers to be defined as a wireless landmark, and/or other operations associated with wireless landmark-based operations of a wireless device. Note that at least a portion of those operations may be embodied in processor 750, communications subsystem 730, and/or a separate subsystem not depicted.

The described embodiments may be provided as a personal device program product, or software, that may include a machine-readable medium having stored thereon instructions, which may be used to program a wireless device (or other electronic device(s)) to perform functionality consistent with the invention. A machine readable medium includes any mechanism for storing or transmitting information in a machine-readable form (e.g., software or a processing application readable by a convergence device). The machine-readable medium may include, but is not limited to, magnetic storage medium (e.g., floppy diskette), optical storage medium (e.g., CD-ROM), magneto-optical storage medium; read only memory (ROM), random access memory (RAM), erasable programmable memory (e.g., EPROM and EEPROM), flash memory, or other types of medium suitable for storing electronic instructions. In addition, the invention may be embodied in an electrical, optical, acoustical or other form of propagated signal (e.g., carrier waves, infrared signals, digital signals, etc.), or wireline, wireless, or other communications medium.

Figure 8:
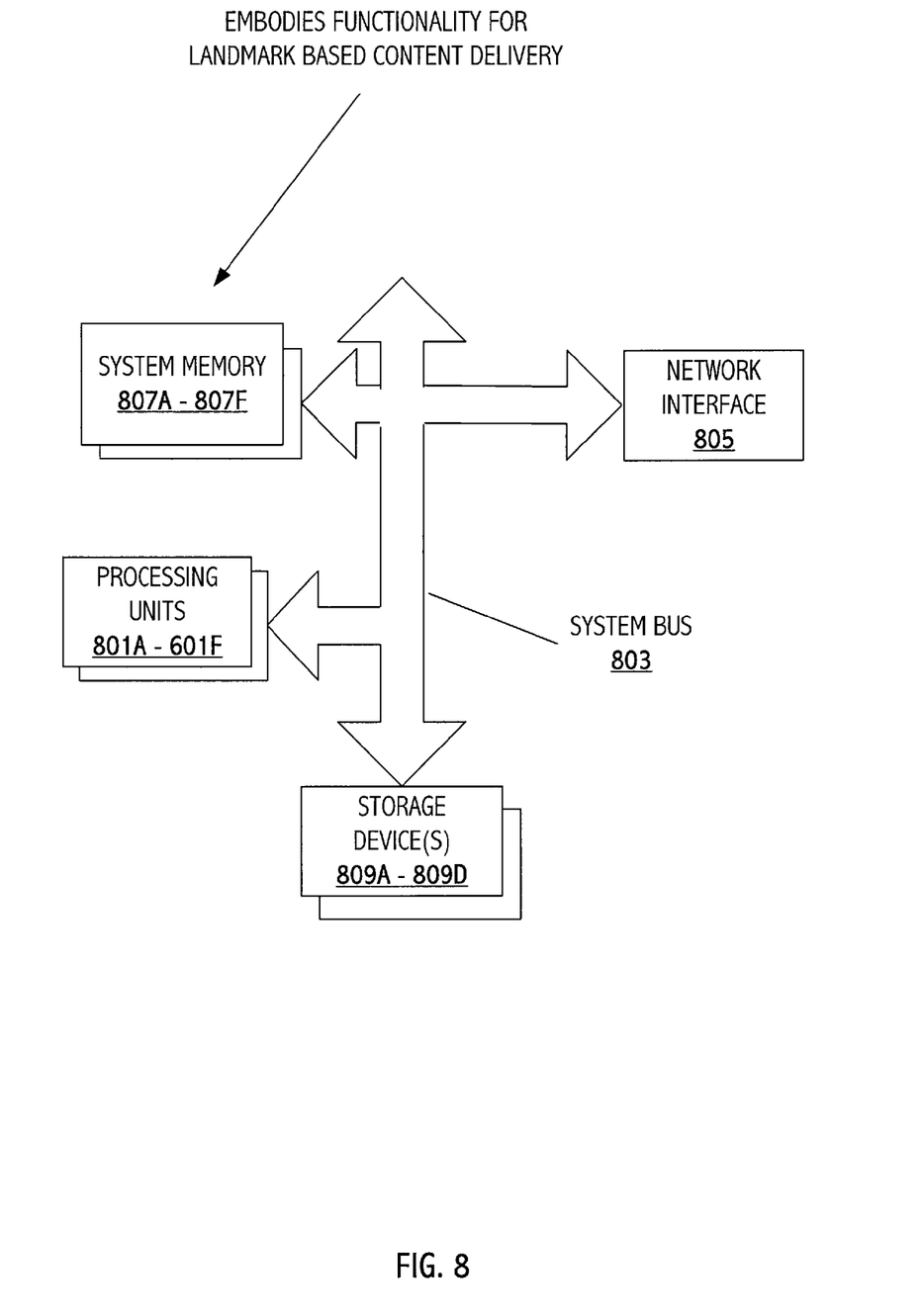
FIG. 8 illustrates an exemplary information processing system.

Referring to FIG. 8, an exemplary computer system, which may be included in server 407 and/or network server 401, includes one or more processor unit (e.g., processor units 801A-801F), which may include multiple processors, multiple cores, multiple nodes, and/or implementing multi-threading, etc. The computer system includes storage devices (e.g., storage devices memory 807A-807F). Storage devices 807A-807F may be system memory (e.g., one or more of cache, SRAM, DRAM, RDRAM, EDO RAM, DDR RAM, EEPROM, etc.) or any one or more of the above already described possible realizations of machine-readable media. The exemplary computer system also includes system bus 803 (e.g. PCI, ISA, PCI-Express, HyperTransport, Infini-Band, NuBus, etc.), network interface 805 (e.g., an ATM interface, an Ethernet interface, a Frame Relay interface, SONET interface, etc.), and storage device(s) 809A-809D (e.g., optical storage, magnetic storage, etc.). System memory 807A-807F embodies functionality for wireless landmark-based content delivery. Functionality for a wireless landmark-based content delivery may be partially (or entirely) implemented in hardware and/or on processing unit 801. For example, the functionality may be implemented with an application specific integrated circuit, in a peripheral device or card, etc. Realizations may include fewer or additional components not illustrated in FIG. 8 (e.g., video cards, audio cards, additional network interfaces, peripheral devices, etc.). The processor unit 801, the storage device(s) 809A-809D, network interface 805, and memory 807A-807F are coupled directly or indirectly to system bus 803.

Other Embodiments

While the embodiment(s) is (are) described with reference to various implementations and exploitations, it will be understood that these embodiments are illustrative and that the scope of the invention(s) is not limited to them. Many variations, modifications, additions, and improvements are possible. For example, the description above refers to cell site identifiers and wireless router identifiers, such as a service set identifier (SSID). However, wireless signal source identifiers are not limited thereto. Similarly, although the previous examples refer to a mobile phone, the described functionality and operations may be performed by and/or with a variety of wireless devices (e.g., personal data assistant (PDA), multi-media player, portable game console, a convergence device, such as a multimedia communications device with PDA capabilities, etc.). In some instances, well-known instruction instances, protocols, structures and techniques have not been shown in detail in order not to obfuscate the description.

In addition, plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

The invention claimed is:

1. A method for wireless landmark-based operation of a wireless device, the method comprising:
   detecting a wireless communications signal by the wireless device;
   recognizing a wireless signal source identifier associated with the detected wireless communications signal as a wireless landmark associated with a particular physical environment, the recognizing including searching a data structure in the wireless device for an indicator corresponding to the wireless signal source identifier; and
   performing a set of one or more operations associated with the wireless landmark by the wireless device, the set of one or more operations being conditionally performed based on an account balance associated with the wireless device and a power level of the device,
   wherein the one or more operations do not include an operation establishing communications between the wireless device and a device associated with the wireless communications signal.

2. The method of claim 1 further comprising:
   detecting another wireless communications signal having the associated wireless signal source identifier;
   associating the wireless signal source identifier with the particular physical environment, thereby determining the wireless landmark; and
   associating the set of one or more operations with the wireless landmark.

3. The method of claim 2, wherein the wireless landmark is defined by a user of the wireless device or pre-defined by one or more menus selected by the user.

4. The method of claim 2 further comprising selecting the wireless communications signal from a set of detected wireless communications signals, the selecting being based on signal strength of individual signals of the set of detected wireless communications signals.

5. The method of claim 1, wherein the set of one or more operations manipulate media content.

6. The method of claim 1, wherein the one or more operations comprise playing a playlist of media content.

7. The method of claim 1, wherein the physical environment comprises a vehicle.

8. The method of claim 1, wherein the wireless device comprises one of a mobile phone, personal data assistant, portable music device, and a convergence device.

9. A wireless device program product encoded in one or more tangible machine-readable media, the wireless device program product comprising:
a first sequence of instructions executable to recognize a wireless signal source identifier as a wireless landmark for a particular physical environment based on a search of a data structure in the wireless device for an indicator corresponding to the wireless signal source identifier; and
a second sequence of instructions executable to determine a set of one or more wireless device operations to perform in response to recognizing the wireless signal source identifier as a wireless landmark, the set of operations being conditionally performed based on a power level of the device,
wherein the set of operations does not include an operation establishing communications between the wireless device and a device associated with the wireless communications signal.

10. The wireless device program product of claim 9 further comprising a third sequence of instructions executable to encode in the data structure individual indications of physical environments, individual indications of wireless device operations, and individual wireless signal source identifiers, corresponding to respective wireless landmarks.

11. The wireless device program product of claim 9 further comprising an interface sequence of instructions executable to receive user input defining indications of physical environments.

12. The wireless device program product of claim 9 further comprising a search sequence of instructions executable to detect one or more wireless communications signals that encode corresponding wireless signal source identifiers and executable to select an individual one of the one or more wireless communications signals and executable to associate a wireless signal source identifier encoded in the selected wireless communications signal with an indication of a physical environment.

13. The wireless device program product of claim 12, wherein the selecting is based on signal strength of individual signals on the one or more wireless communications signals.

14. The wireless device program product of claim 12, wherein the search sequence of instructions is further executable to present one or more characteristics of any detected wireless communications signals to a user for selection and association with the indication of the physical environment.

15. The wireless device program product of claim 9 further comprising an interface sequence of instructions executable to present a user with one or more indications of physical environments for selection by the user.

16. A wireless device comprising:
means for configuring the wireless device to associate with a physical environment, a wireless signal source identifier associated with a wireless communications signal received by a wireless receiver, thereby establishing a wireless landmark;
means for recognizing as the wireless landmark corresponding to the physical environment, the wireless signal source identifier, the recognizing including searching the means for configuring for an indicator corresponding to the wireless signal source identifier; and
means for performing one or more operations based, at least in part, on recognizing the wireless landmark by the recognizing means, the one or more operations being conditionally performed based on a power level of the wireless device,
wherein the one or more operations do not include an operation establishing communications between the wireless device and a device associated with the wireless communications signal.

17. The method of claim 1, wherein the physical environment comprises a generic physical environment associated with multiple locations of a particular business.

18. The method of claim 1, wherein the set of one or more operations are conditional performed further based on detecting an additional wireless communications signal by the wireless device and recognizing that an additional wireless signal source identifier associated with the detected additional wireless communications signal is associated with the particular landmark.

19. The method of claim 1, wherein the physical environment is a mobile environment.

20. The wireless device program product of claim 17, wherein the physical environment comprises a mobile environment.

21. The wireless device program product of claim 9, wherein the one or more wireless device operations comprise accessing a playlist of media content.

22. The wireless device program product of claim 9 wherein the first sequence of instructions and the second sequence of instructions are encoded in one or more of a magnetic storage medium, optical storage medium, magneto-optical storage medium, read only memory, random access memory, erasable programmable memory, and flash memory.

* * * * *

UNITED STATES PATENT AND TRADEMARK OFFICE
CERTIFICATE OF CORRECTION

PATENT NO. : 8,140,093 B2
APPLICATION NO. : 11/624552
DATED : March 20, 2012
INVENTOR(S) : Richard Zaffino It is certified that error appears in the above-identified patent and that said Letters Patent is hereby corrected as shown below:

Title Page item (73), replace "AT&T Mobility II, LLC," with --AT&T Mobility II LLC, f/k/a Cingular Wireless II, LLC--
Col. 12, line 38 (Claim 20), replace "claim 17," with --claim 9,--

Signed and Sealed this
Twenty-fourth Day of April, 2012

David J. Kappos
*Director of the United States Patent and Trademark Office*